US012574325B2

(12) United States Patent
Sharma

(10) Patent No.: US 12,574,325 B2
(45) Date of Patent: Mar. 10, 2026

(54) METHOD AND SYSTEM FOR OPTIMIZING VIRTUAL NETWORK DPU TRAFFIC MANAGEMENT

(71) Applicant: VMware LLC, Palo Alto, CA (US)

(72) Inventor: Ankur Kumar Sharma, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 119 days.

(21) Appl. No.: 18/671,682

(22) Filed: May 22, 2024

(65) Prior Publication Data

US 2025/0240244 A1 Jul. 24, 2025

Related U.S. Application Data

(60) Provisional application No. 63/623,115, filed on Jan. 19, 2024.

(51) Int. Cl.
*H04L 47/122* (2022.01)
*H04L 43/062* (2022.01)
*H04L 47/125* (2022.01)

(52) U.S. Cl.
CPC .......... *H04L 47/122* (2013.01); *H04L 43/062* (2013.01); *H04L 47/125* (2013.01)

(58) Field of Classification Search
CPC ....... H04L 45/54; H04L 49/70; H04L 47/122; H04L 43/062; H04L 47/125
See application file for complete search history.

(56) References Cited

U.S. PATENT DOCUMENTS

| | | | | |
|---|---|---|---|---|
| 7,643,482 B2 * | 1/2010 | Droux | .................... | H04L 69/16 |
| | | | | 370/389 |
| 9,634,948 B2 * | 4/2017 | Brown | .................... | G06F 9/455 |
| 10,681,000 B2 * | 6/2020 | Wang | .................. | H04L 61/2514 |
| 2014/0185611 A1 * | 7/2014 | Lie | .......................... | H04L 45/34 |
| | | | | 370/355 |
| 2023/0418648 A1 * | 12/2023 | Tsirkin | ................ | G06F 9/45558 |
| 2024/0205184 A1 * | 6/2024 | Cui | ..................... | H04L 61/5038 |
| 2025/0240244 A1 * | 7/2025 | Sharma | .................. | H04L 49/70 |

* cited by examiner

*Primary Examiner* — Jerry B Dennison
(74) *Attorney, Agent, or Firm* — Quarles & Brady LLP

(57) ABSTRACT

A system for optimizing network traffic management is provided. The system includes a plurality of data processing units (DPUs), each assigned an identifier and configured to process network traffic for associated virtual network interface cards (vNICs). The system also includes a vNIC placement handler configured to receive media access control (MAC) address information from the plurality of DPUs and execute a relocation of at least two vNICs to be directly associated with one of the plurality of DPUs without through an inter-DPU physical network based on mapping the MAC address information to the identifier. The system further includes a communication framework integrated with the vNIC placement handler to enable transmission of MAC address information from the plurality of DPUs to the vNIC placement handler and offload network traffic from the vNICs to corresponding one or more of the plurality of DPUs.

20 Claims, 6 Drawing Sheets

DPU 1 (DPU ID: DPU331) MAC Table

| MAC Address | Learn Source | MAC Type |
|---|---|---|
| ...... | ...... | ...... |
| vNIC1_MAC | Local | Static |
| vNIC2_MAC | Remote | Dynamic |

DPU 2 (DPU ID: DPU332) MAC Table

| MAC Address | Learn Source | MAC Type |
|---|---|---|
| ...... | ...... | ...... |
| vNIC1_MAC | Remote | Dynamic |
| vNIC2_MAC | Local | Static |

FIG. 4

| MAC Address | Identifier of DPU | Additional Information |
|---|---|---|
| 00:1A:2B:3C:4D:5E | H1DPU331 | Remote MAC information, Port Number, IP address, VLAN ID, Learn Source, Type, Status |
| 00:1A:2B:3C:4D:5F | H1DPU332 | |

assigning identifiers unique respectively to two DPUs

602 implementing a vNIC placement handler

604 collecting media access control (MAC) address information associated with the vNICs

606 transmitting the MAC address information from each DPU to the placement handler

608 constructing a MAC learning table that maps MAC addresses to the identifiers of the two DPUs based on the MAC address information

610

Identifying benefits of two vNICs to be co-located on one DPU based on the MAC learning table

612

Relocating the two vNICs to be local on the same DPU

METHOD AND SYSTEM FOR OPTIMIZING VIRTUAL NETWORK DPU TRAFFIC MANAGEMENT

CROSS REFERENCE TO RELATED APPLICATIONS

This application claims the benefit of U.S. Provisional Application No. 63/623,115, filed Jan. 19, 2024 by Ankur Sharma and titled, "SMARTNIC ALIGNED VNIC PLACE-MENT", the entire teachings of which is hereby incorporated by reference in its entirety for all purposes.

FIELD OF INVENTION

The subject technology is directed to a virtual network system and method for data traffic management.

BACKGROUND OF THE INVENTION

In a modern computing network, each host may house several data processing units (DPUs) with embedded central processing unit (CPU) cores. The DPUs are specialized to use their own processing power to offload network process-ing tasks from the system CPU, thus freeing up CPU resources for other computations. In a virtualized version of the computing environment, multiple virtual machines (or specifically virtual network interface cards vNICs) are implemented into the network independently to enhance redundancy and increase bandwidth by enabling multiple vNICs to be actively connected and utilized simultaneously. In an active-active setup, multiple NICs are connected and active at the same time. If one NIC fails, another can take over without any disruption in network connectivity. This deployment provides resiliency against a NIC going down as well as better utilization of hardware resources.

In the scenario where two vNICs are offloaded to two different DPUs, however, the intra-host communication must traverse the physical network. This detour increases the travel distance for packets, resulting in higher network latency. Even though DPUs are designed to offload and accelerate network processing from the CPU, the physical routing of packets intended for local delivery can negate these performance gains due to higher latencies. Addition-ally, using vNICs across different DPUs can result in dupli-cated states. For instance, if a firewall policy is in place, vNICs that are not aligned with the same DPU will each use a connection tracking state in separate DPUs. Therefore, a solution for aligning different vNICs to the same DPU is desired to mitigate these challenges.

BRIEF DESCRIPTION OF THE DRAWINGS

A further understanding of the nature and advantages of particular embodiments may be realized by reference to the remaining portions of the specification and the drawings, in which reference numerals are used to refer to similar com-ponents. In some instances, a sub-label is associated with a reference numeral to denote one of multiple similar com-ponents. When reference is made to a reference numeral without specification to an existing sub-label, it is intended to refer to all such multiple similar components.

FIG. 4 shows examples of media access control (MAC) tables for the two active DPUs according to an embodiment of the subject technology.

FIG. 5 shows an example of a MAC learning table generated by a vNIC placement handler according to an embodiment of the subject technology.

FIG. 6 shows a method for optimizing network traffic management within a computing environment according to an embodiment of the subject technology.

DETAILED DESCRIPTION OF THE INVENTION

Figure 1:
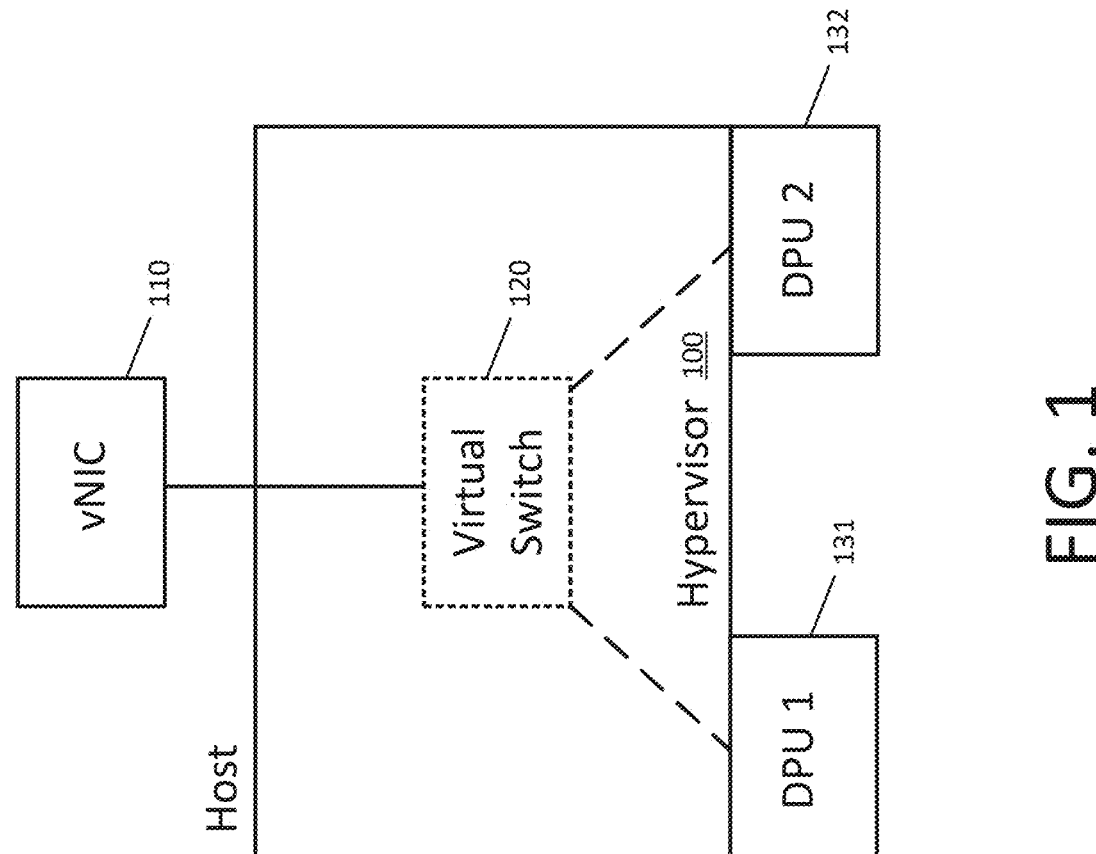
FIG. 1 is a simplified block diagram of a virtual comput-ing network environment with a host housing at least two active DPUs according to an embodiment of the subject technology.

The subject technology provides a system for optimizing network traffic management. The system includes a plurality of DPUs, each being assigned an identifier and configured to process network traffic for associated vNICs. The system also includes a vNIC placement handler configured to receive MAC address information from the plurality of DPUs and execute the relocation of at least two vNICs to be locally associated with one of the plurality of DPUs to optimize network traffic management based on mapping the MAC address information to the identifier.

The following description is presented to enable one of ordinary skill in the art to make and use the invention and to incorporate it in the context of particular applications. Vari-ous modifications, as well as a variety of uses in different applications, will be readily apparent to those skilled in the art, and the general principles defined herein may be applied to a wide range of embodiments. Thus, the present invention is not intended to be limited to the embodiments presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and docu-ments which are filed concurrently with this specification and which are open to public inspection with this specifi-cation, and the contents of all such papers and documents are incorporated herein by reference. All the features disclosed in this specification, (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

Furthermore, any element in a claim that does not explic-itly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element (which may refer to electrical coupling or connection, or coupling or connection for data communication purposes), it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Moreover, the terms left, right, front, back, top, bottom, forward, reverse, clockwise, and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and the use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require the selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

FIG. 1 is a simplified block diagram of a virtual computing network environment with a host housing at least two active DPUs according to an embodiment of the subject technology. This diagram is merely an example and should not unduly limit the scope of the claims. One of ordinary skill in the art would recognize many variations, alternatives, and modifications. In a virtual computing network environment, a virtual machine is equipped with a vNIC 110, operating within a host machine. For example, a vNIC may be an emulation of a physical network interface card created by software. It acts like a traditional NIC by facilitating network communication, but it operates within a virtualized environment on a server or workstation. The vNIC allows virtual machines (VMs) or containers running on a host to connect to and communicate over a network as if they were connected by physical NICs. This enables each virtual machine to have its own network identity and configuration, including IP addresses, MAC addresses, and connection settings, independent of the underlying physical hardware. For example, in a cloud computing platform, multiple virtual servers are hosted on a single physical server. Each virtual server runs its own operating system and applications and requires independent network access. By using vNICs, each virtual server can have its own unique network settings and operate as if it were running on its own separate physical server.

This host accommodates at least two DPUs 131 and 132, also referred to as Smart NICs. Here two DPUs are described for illustration purposes. There can be more than two DPUs in the host. Each DPU functions as a physical NIC and possesses its own processing capabilities, such as an embedded ARM core, for example, working in conjunction with the host's standard CPU. The network infrastructure also incorporates a virtualization layer provided by a hypervisor 100, integrated into the host's architecture. Hypervisor is a general term for software that creates and manages virtual machines. This hypervisor 100 is integrated with host architecture to manage central services and network resources of the virtualized computing environment while overseeing the operations of the vNIC 110 on the host. Specifically, the hypervisor 100 features a virtual switch 120, a software switch that runs in the hypervisor, that facilitates communication between all vNICs in the host and offloads network traffic from the vNICs to either of the DPUs 131 or 132 to perform data processing while saving the hypervisor CPU cores.

Figure 2:
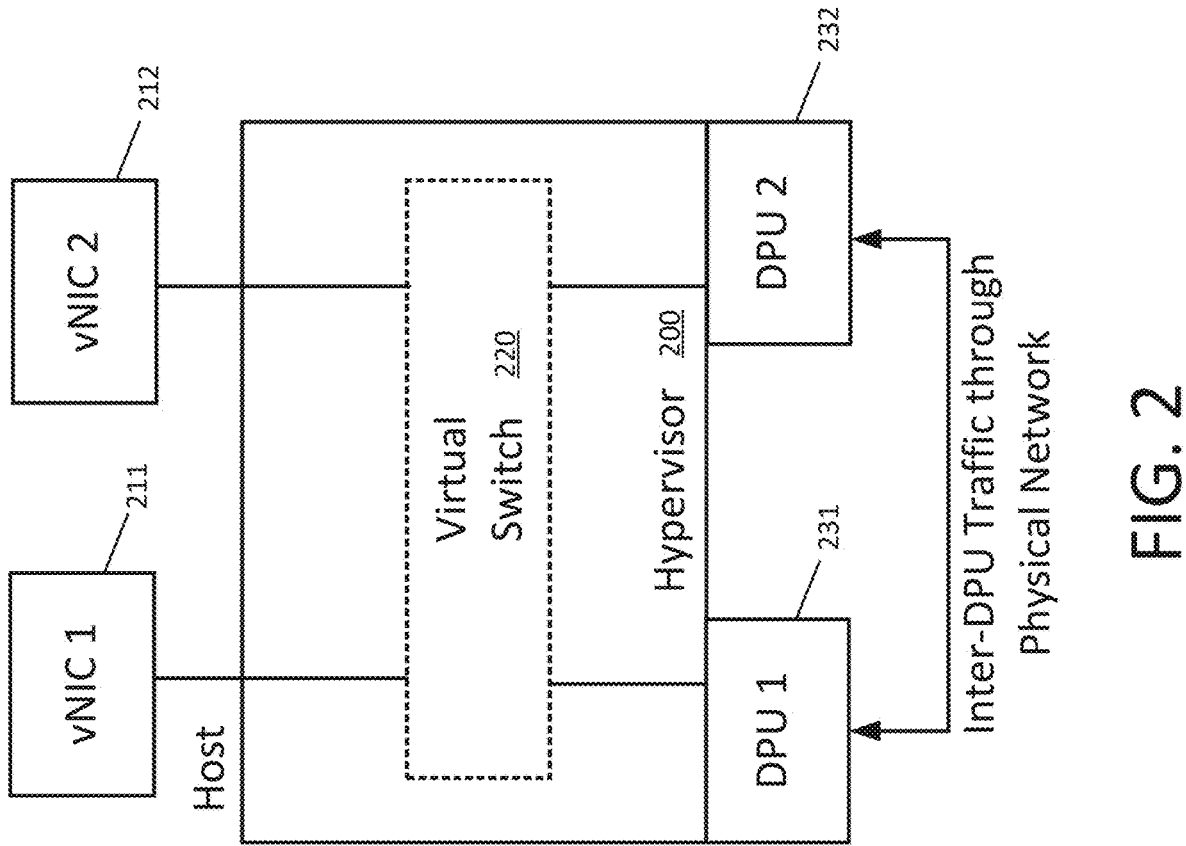
FIG. 2 is a simplified block diagram of a virtual comput-ing network host environment with two independent vNICs running on a host housing at least two active DPUs accord-ing to an embodiment of the subject technology.

FIG. 2 is a simplified block diagram of a virtual computing network environment with two independent vNICs running on a host housing at least two active DPUs according to an embodiment of the subject technology. This diagram is merely an example and should not unduly limit the scope of the claims. One of ordinary skill in the art would recognize many variations, alternatives, and modifications. In the embodiment, two virtual machines equipped with vNICs 211 and 212 are independently deployed on a host in a virtual computing network environment. Similar to that in FIG. 1, the host in FIG. 2 houses two DPUs 231 and 232 that are active to receive offload network traffic from the two vNICs 211 and 212. Here two vNICs and two DPUs are described for illustration purposes. Both vNICs and DPUs can be more than two in one host. The network traffic and other network resources are managed by Hypervisor 200, a software integrated into the host's architecture. The hypervisor 100 features a virtual switch 220 that facilitates communication between the two vNICs across the host. In the scenario of dual active DPUs, the redundancy of DPUs provides resiliency against a DPU failure as well as better utilization of hardware resources. This diagram also applies to the virtual computing network environment with more than one host. The two vNICs may be implemented on different hosts. In this case, the communication between the two vNICs involves inter-host traffic, which also has to go through one or more physical network links to different DPUs that are housed in the same or different hosts.

An application concern with the introduction of active-active dual DPUs is that communication between vNICs may invoke inter-host or even intra-host traffic over the physical network. If the endpoints of the two vNICs are distributed (or offloaded) to two different DPUs, then any traffic between the two vNICs will be processed through the host's physical network by both DPUs, as the inter-DPU traffic must go through the physical network. This extra processing and the fact that for inter-host or intra-host traffic, packets will leave DPU1 (221) to go through the physical network and come back via DPU2 (222) and be processed again will lead to higher latencies. For example, an inter-DPU physical network may be the tangible infrastructure and connections that enable communication and data exchange between multiple DPUs within a computing system or across a distributed network. This physical network encompasses the hardware components, physical media (such as cables and switches), and the associated connectors that facilitate direct interaction between DPUs. The aim is to offload specific computational tasks from the CPUs, optimizing data throughput, minimizing latency, and enhancing overall system performance in data-centric applications. Additionally, having vNICs misaligned on different DPUs, i.e., not locally linking to one DPU, may lead to state duplication. For example, if there is a firewall policy in place, then the DPU-misaligned vNICs will end up consuming connection tracking states in different DPUs. To mitigate this concern, a mechanism associated with the subject technology is introduced in this specification. It identifies whether any two vNICs that are communicating have their network traffic passing through different DPUs. This mechanism thereby enables the relocation of the vNICs to be locally associated with the same DPU.

One general aspect of the subject technology includes a system for optimizing network traffic management. The system also includes a plurality of DPUs, each assigned an identifier and configured to process network traffic for associated vNICs. The system also includes a vNIC placement handler configured to receive MAC address information from the plurality of DPUs and execute a relocation of at least two of the vNICs to be directly associated with one of the plurality of DPUs based on mapping the MAC address information to the identifier. The system also includes a communication framework integrated with the vNIC placement handler to enable transmission of MAC address information from the plurality of DPUs to the vNIC placement handler and offload network traffic from the vNICs to the plurality of DPUs. Other embodiments of this aspect include corresponding computer systems, apparatus, and computer programs recorded on one or more computer storage devices, each configured to perform the actions of the methods.

Implementations of the subject technology may include one or more of the following features. The identifier may include a combination of a globally unique host ID and a DPU ID unique to each host. The vNIC placement handler is configured to construct a MAC learning table to map the MAC addresses of the vNICs to respective DPU IDs. The vNIC placement handler is configured to identify the benefits to network traffic management of relocating at least two vNICs to one of the plurality of DPUs, based on the MAC learning table. The vNIC placement handler is configured to relocate the vNICs based on real-time analysis of DPU load conditions and network traffic patterns. The vNIC placement handler is integrated with the architectures of one or more hosts in a virtualized computing environment. The vNIC placement handler is configured to provide centralized management over one or more software-based hypervisors run on each host in a virtualized computing environment. The plurality of DPUs may include at least two or more active physical network interface cards with central processing unit cores. Any two vNICs that are detected to be associated with communication via inter-DPU physical network traffic are configured to be relocated on the same DPU among the plurality of DPUs. The communication framework may include a virtual switch implemented in a software-based hypervisor to manage communications between any two of the vNICs via at least one DPU. Implementations of the described techniques may include hardware, a method or process, or computer software on a computer-accessible medium.

Another general aspect includes a method for optimizing network traffic management within a computing environment having at least two DPUs. The method includes assigning identifiers unique respectively to the two DPUs within the computing environment. The method also includes implementing a placement handler configured to manage the placement of vNICs on the two DPUs. The method also includes collecting, by each DPU, MAC address information associated with the vNICs. The method also includes transmitting the MAC address information from each DPU to the placement handler. The method also includes constructing, by the placement handler, a MAC learning table that maps MAC addresses to the identifiers of the two DPUs, based on the MAC address information. The method also includes identifying, by the placement handler, instances where network traffic between any two vNICs would benefit from being co-located on one of the two DPUs, based on the MAC learning table. The method also includes relocating, by the placement handler, the two vNICs on the same DPU. Other embodiments of this aspect include corresponding computer systems, apparatus, and computer programs recorded on one or more computer storage devices, each configured to perform the actions of the methods.

Implementations may include one or more of the following features. Assigning identifiers unique respectively to two DPUs may include establishing each identifier with a combination of a globally unique host ID and a DPU ID unique to each host. Implementing the placement handler may include configuring the placement handler to provide centralized management over multiple software-based hypervisors run on one or more hosts in a virtualization infrastructure of the computing environment. Implementing the placement handler further may include integrating with a virtual switch to manage network traffic in a virtualization infrastructure of the computing environment. Collecting, by each DPU, media access control (MAC) address information may include using DPU management tools and automation to query the MAC address of each vNIC. Transmitting the MAC address information from each DPU to the placement handler may include formatting the MAC address information in a data format and transmitting formatted data with secure protocols and regular updates. Constructing the MAC learning table includes structuring it with a data structure that includes at least the MAC address of each vNIC on the host and the identifiers of DPUs that are either locally or remotely associated with the vNIC. Identifying may include analyzing network traffic patterns associated with the two vNICs including communication through an inter-DPU physical network and querying the MAC learning table to check if the two DPUs are on the same host. The method may include dynamically adjusting the placement of vNICs based on real-time analysis of DPU load conditions and network traffic patterns to continuously optimize network traffic management. Implementations of the described techniques may include hardware, a method or process, or computer software on a computer-accessible medium.

Yet another general aspect includes a method for optimizing network traffic management in a virtualized computing environment. The method also includes identifying a first DPU and a second DPU uniquely by respective two identifiers. The method also includes implementing a centralized placement handler for managing multiple software applications running on a host within a virtualized computing environment, which includes at least two vNICs. The method also includes collecting, by each DPU, MAC address information associated with the two vNICs. The method also includes storing the MAC address information, by the placement handler, to construct a MAC learning table that maps MAC addresses of the at least two vNICs respectively to the two identifiers of the first DPU and the second DPU. The method also includes detecting, by the placement handler querying the MAC learning table, communications between the two vNICs through a physical network via both the first DPU and the second DPU. The method also includes relocating the at least two vNICs both to be directly associated with either the first DPU or the second DPU. Other embodiments of this aspect include corresponding computer systems, apparatus, and computer programs recorded on one or more computer storage devices, each configured to perform the actions of the methods.

Figure 3:
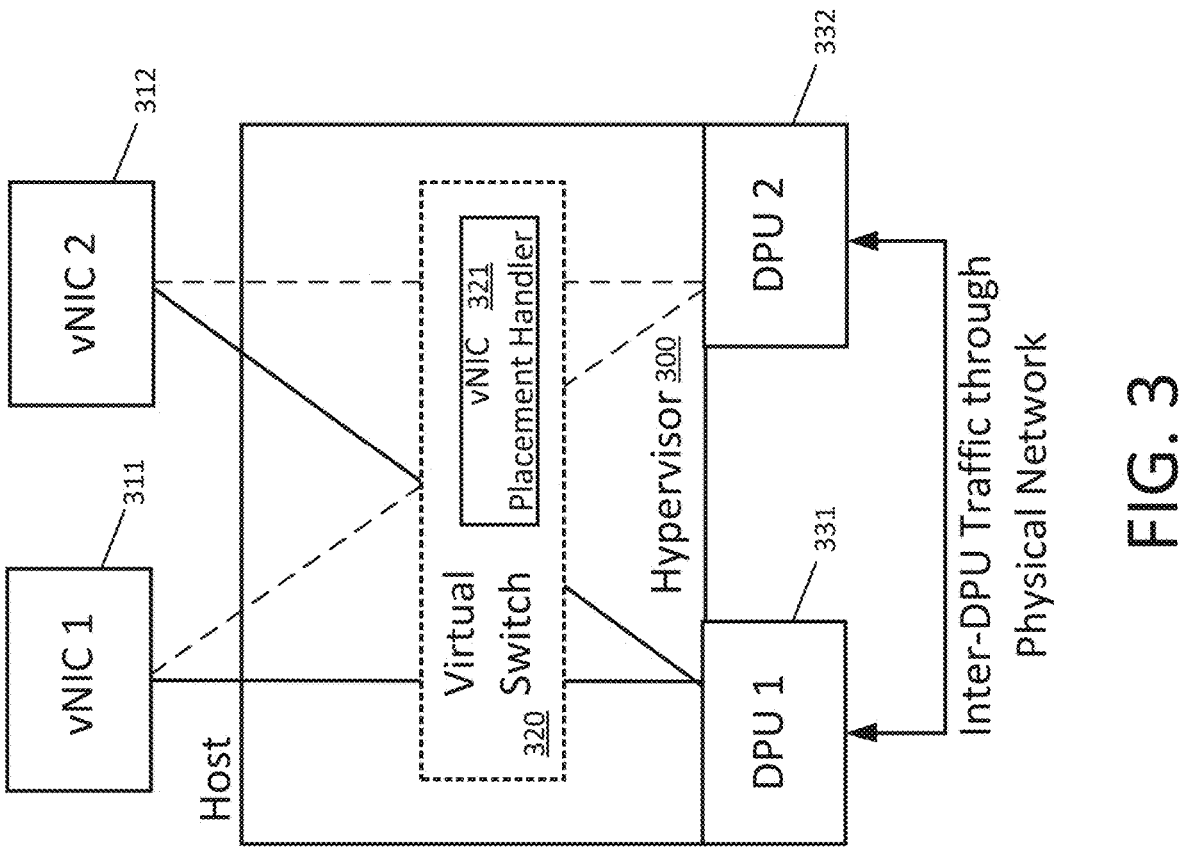
FIG. 3 is a simplified block diagram of a virtual comput-ing network host environment with the two vNICs relocated to be locally associated with one active DPU according to an embodiment of the subject technology.

FIG. 3 is a simplified block diagram of a virtual computing network environment with the two vNICs relocated to be directly associated with one active DPU according to an embodiment of the subject technology. This diagram is merely an example and should not unduly limit the scope of the claims. One of ordinary skill in the art would recognize many variations, alternatives, and modifications. In a virtual computing network environment like that in FIG. 2, two (or more) vNICs, e.g., denoted as 311 and 312, are implemented on the host in FIG. 3. One or more software-based hypervisors 300 are integrated with the host's virtualized infrastructure. In a specific embodiment, hypervisor 300 features a virtual switch 320 to manage network traffic to or from the vNICs across the host including offloading data traffic to the two (physical) DPUs 331 and 332 to utilize their data processing powers in addition to the processing in a standard CPU.

Although not shown in the figure, the virtual computing network environment host architecture may include multiple hosts. Each host may be implemented with multiple vNICs (e.g., multiple virtual machines equipped with vNICs) in the computing environment and each host may house multiple DPUs that can be actively utilized to process data offloaded from one or more vNICs. In an embodiment of the subject technology for managing network traffic for dual-active DPUs in such a virtual computing network environment, a centralized vNIC placement handler 321 is implemented in the host to provide centralized management on how each vNIC is connected via the virtual switch 320 and assigned to different resources over one or more software-based hypervisors run on each host in a virtualized computing environment.

For example, a vNIC placement handler may be a software component within a virtualized computing environment designed to optimize the allocation and management of vNICs across multiple VMs and physical host devices. This handler is to ensure that network traffic is efficiently routed, and resources are effectively utilized, reduce potential bottlenecks, and enhance overall network performance. By intelligently managing how vNICs are assigned to different DPUs or physical adapters, the vNIC placement handler can greatly improve response times, balance loads, and ensure redundancy and high availability of network services. The vNIC placement handler typically operates based on a set of policies and criteria, such as network traffic patterns, security requirements, or specific application needs. It dynamically adjusts the placement and configuration of vNICs in response to changes in the virtual environment, such as the spinning up of new VMs, changes in network load, or modifications in network topology.

For example, the vNIC placement handler can be located on the X86 side or be centrally located for multiple hypervisors 300. Optionally, the vNIC placement handler 321 can be logically implemented within the virtual switch 320 or at a layer closely integrated with it. The vNIC placement handler can be configured to automate the assignment of vNICs to different network segments (e.g., VLANs) created by the virtual switch based on policies or virtual machine characteristics. The vNIC placement handler can also be configured to help distribute network traffic efficiently across different physical network interfaces to prevent bottlenecks. Other features of the vNIC placement handler may include but are not limited to, enforcing security policies and automating the process of assigning vNICs to appropriate virtual switches or port groups. A centrally located vNIC placement handler could co-exist with other central services such as the management plane or control plane in a hypervisor environment across one or more hosts.

In another embodiment, in the host architecture shown in FIG. 3, each DPU is assigned an identifier which can be a globally unique ID (across different hosts) or a combination of a globally unique host ID (to identify the host in which it is contained) and a DPU ID unique to the DPU within the host (to identify itself in the host). For example, in FIG. 3, DPU 1 is assigned with a DPU ID: DPU331, and DPU 2 is assigned with a DPU ID: DPU332 in the host. In yet another embodiment, the host (through one or more hypervisors 300) can create a MAC table for each DPU to save the DPU ID. Each DPU is also configured to collect MAC address information associated with the vNICs using DPU management tools, scripting languages, automation to query MAC the address of each vNIC, and network statistics on connection status and traffic data. The MAC address information is also becoming an attribute in the MAC table created for each DPU. FIG. 4 shows examples of MAC tables for the two active DPUs according to an embodiment of the subject technology. As shown, a MAC table includes at least the MAC address of each vNIC, e.g., vNIC1_MAC, in the network. Some vNICs, e.g., vNIC1 (311), may be indicated as being locally or directly associated with DPU 1 (referred to as local MAC) by going through the inter-DPU physical network, which may be just learned as the DPU 1 collects the MAC address information of all vNICs in the network. While some other vNICs, e.g., vNIC2 (312), may be indicated as being remotely linked to DPU 1 (referred to as remote MAC), indicating that the connection from the vNIC2 (312) to DPU 1 must go through the host physical network between different DPUs. MAC type either "Dynamic" or "Static" refers to whether the MAC address was learned dynamically through network traffic or whether it was manually entered into the table (static). The same table structure is given to the DPU 2 MAC table with its own unique attributes. Each MAC table may be associated with a unique DPU ID. For example, the DPU 1 MAC table is associated with DPU331, DPU 2 MAC table is associated with DPU332.

Additionally, with the centralized vNIC placement handler 321 being implemented, each DPU is also configured to transmit the MAC address information from each DPU to the placement handler through a communication framework. A communication framework in a virtual computing environment refers to the structured methods and protocols designed to facilitate effective and efficient communication between various components within the virtual infrastructure. This framework encompasses the guidelines, tools, and standards that ensure seamless interactions between VMs, hypervisors, management software, and physical hardware resources. By defining clear communication protocols and interfaces, such a framework aids in minimizing latency, enhancing data throughput, and ensuring the reliability of data transmission, all crucial for maintaining the performance and stability of virtualized systems. In an embodiment, transmitting the MAC address information includes formatting the MAC address information in a data format and using the formatted data with secure protocols and regular updates. The hypervisor, also known as the virtual machine monitor (VMM), is the software, firmware, or hardware that creates and runs VMs. It manages the system's hardware resources and allocates them to VMs accordingly. The hypervisor may utilize a virtual switch operated within the communication framework to provide network traffic management, inter-vNIC communication, interface for network configuration, and integration with physical network resources.

In an embodiment, transmitting the MAC information from each DPU provides at least the local MAC information to the vNIC placement handler, which contains an attribute of a unique DPU ID indicating that the DPU is locally or directly associated with a vNIC identified by a MAC address, along with other regular attributes. Each DPU may also provide information on remote MACs seen from all network uplinks (including the placement handler) managed by the virtual switch in the hypervisor infrastructure. This information will also be tagged with the DPU ID.

With the above information from each DPU, the vNIC placement handler will, in an embodiment, perform the following operations: For each host, using the local MAC information from the corresponding DPUs, prepare a MAC learning table that maps the MAC addresses of vNICs to the identifiers of the DPUs. FIG. 5 shows an example of a MAC learning table generated by a vNIC placement handler according to an embodiment of the subject technology. For example, the MAC learning table may be a database maintained by network switches. It stores the MAC addresses of devices connected to the switch along with the corresponding port number through which the device is connected. As shown in the example, the MAC learning table includes a data structure comprising at least the MAC address of each vNIC on the host, identifier of a DPU locally or directly associated with the corresponding vNIC without going through the inter-DPU physical network, and additional information such as remote MAC information (including identifiers of remote DPUs), port number of the vNIC, IP address, virtual local area network (VLAN) ID, etc. Some of the additional information enables the querying capability based on an application programming interface. For example, through the network queuing process based on the table, the vNIC (311) with the MAC address 00:1A:2B:3C:4D:5E is learned to be locally associated with the identifier H1DPU331 (referred to as DPU 1 in the host in FIG. 3) without another network link. However, it is associated with other DPUs remotely through the inter-DPU physical network (via remote MAC information), such as H1DPU332. Another vNIC (312) in the same host has a given MAC address of 00:1A:2B:3C:4D:5F and is found to be locally associated with H1DPU332 but remotely associated with H1DPU331.

Based on mapping the MAC address to the identifier of a first DPU, the vNIC placement handler is allowed to conduct a placement operation for the vNICs, e.g., specifically aligning one or more vNICs locally to the first DPU selected by the identifier. Also based on the remote MAC information received from a second DPU, the vNIC placement handler can check if the second DPU is on the same host. If it is from the same host, the vNIC placement handler can decide to align one or more vNICs to be locally associated with just one of the first DPU and the second DPU. The vNIC placement handler may base the vNIC placement decision on criteria that identify instances where network traffic between the vNICs would benefit from being collocated or aligned on a single DPU. The criteria can be static settings given by the host or DPU load-based. For example, the vNIC placement handler can make the vNIC placement decision based on analyzing network traffic patterns associated with the two vNICs having communication through the inter-DPU physical network and querying the MAC learning table to check if the associated two DPUs are on the same host. For a load-based algorithm, the vNIC placement handler may further seek additional information from DPUs like actual load because of corresponding data flows. The vNIC placement handler is configured to dynamically relocate the vNICs based on real-time analysis of DPU load conditions and network traffic patterns to continuously optimize network traffic management. Overall, this vNIC placement operation ensures that any two mutually communicating vNICs, though initially associated with separate active DPUs, can be relocated to be locally associated with a single DPU without going through the inter-DPU physical network, thereby reducing network latencies. FIG. 3 shows an option of co-locating both vNIC 311 and vNIC 312 to the DPU 1 (331) by the placement handler 321, as indicated by the solid lines connected from the two vNICs via the virtual switch 320 to the DPU 331. There is an alternative option for the placement handler 321 to align both vNICs (311 and 312) with DPU 332, as suggested by the dashed lines linking them via the virtual switch 320 under hypervisor 300.

FIG. 6 shows a method for optimizing network traffic management within a computing environment according to an embodiment of the subject technology. This diagram is merely an example and should not unduly limit the scope of the claims. One of ordinary skill in the art would recognize many variations, alternatives, and modifications. In an embodiment, method 600 is provided to optimize network traffic management within a virtualized computing environment with two DPUs. Method 600 includes step 602 for assigning identifiers unique respectively to the two DPUs in the virtualized computing network environment. This arrangement allows each DPU to incorporate network traffic management within a host's architecture in the virtualized computing network environment. For example, a unique identifier for each DPU could be globally unique or could be a combination of a globally unique host ID and a DPU ID unique to the host. The DPU is a hardware device, similar to an advanced network card, that is associated with a host (e.g., a server or other physical computing device). It can take over specific tasks from the standard CPU, such as network packet processing, to enhance network performance. In the scenarios with at least two active DPUs on the same host, two virtual machines equipped with vNICs have mutual communication that goes through the physical network from one DPU to another DPU because each vNIC uses only one of the two DPUs, leading to high latencies.

Further, method 600 includes step 604 for implementing a vNIC placement handler that is centralized to the virtualized computing network environment. This centralized placement handler is designed to manage vNIC placement across multiple DPUs (among one or more hosts) in the virtualized computing network environment. This handler could be located on the X86 side or could be centrally located for multiple software-based hypervisors integrated with the host's architecture. A centrally located vNIC place-ment handler could coexist with other central services such as the management plane or control plane within the host. Optionally, the vNIC placement handler may be logically implemented within a virtual switch controlled by the hyper-visor or closely integrated with it. Optionally, implementing the vNIC placement handler includes configuring the place-ment handler to provide centralized management via mul-tiple software-based hypervisors run on one or more hosts in a virtualization infrastructure of the computing environment.

Referring to FIG. 6, method 600 also includes step 606 for collecting MAC address information associated with the vNICs. In a specific embodiment, collecting, by each DPU, the MAC address information may include using DPU management tools, scripting languages, automation to query the MAC address of each vNIC, and/or network statistics on connection status and traffic data. The collected MAC address information can be saved in a MAC table in each DPU. Each MAC table also saves the DPU ID as well. This step is performed by each DPU to prepare a MAC table that can be populated through the network based on dynamic MAC learning and static MAC input (by the host). The MAC table contains information about local and remote MAC addresses of vNICs seen on the DPU.

Referring again to FIG. 6, method 600 also includes step 608 for transmitting the MAC address information from the DPU to the vNIC placement handler. In an embodiment, transmitting the MAC address information includes format-ting the MAC address information in a data format (e.g., a MAC table) and transmitting formatted data with secure protocols and regular updates via a virtual switch under a software-based hypervisor infrastructure integrated with the host architecture. In a specific embodiment, each DPU provides local MAC information to the vNIC placement handler, the local MAC information includes a DPU ID which indicates it is locally associated with a vNIC at a given MAC address. Each DPU also transmits the informa-tion on remote MAC addresses of some vNICs that are remotely associated with the DPU. This remote MAC infor-mation is provided to all network uplinks including the vNIC placement handler. With the assigned unique identifier for each DPU, the vNIC placement handler will know the DPU ID to host ID mapping, i.e., know if the two DPUs mentioned in step 602 belong to a common host.

Referring further to FIG. 6, method 600 includes step 610 for constructing a MAC learning table that maps the MAC addresses of the vNICs to the identifiers of the two DPUs (mentioned in step 602) based on the MAC address infor-mation. As seen in an example shown in FIG. 5, the MAC learning table contains a data structure comprising at least the MAC address of each vNIC on the host and the identi-fiers of DPUs locally or remotely associated with the vNIC and additional information regarding how to query the MAC table by other physical or virtual machines.

Furthermore, method 600 also includes step 612 for Identifying the benefit of co-locating two vNICs on one DPU based on the MAC learning table. This step is per-formed by the vNIC placement handler based on network traffic benefit criteria which can be set via static input by the host or can be DPU load-based. For example, this step is to analyze network traffic patterns associated with the two vNICs having communication through the inter-DPU physi-cal network and query the MAC learning table to check if the two DPUs are on the same host. The vNIC placement handler may seek additional information from each DPU, like actual load because of corresponding flows, etc. The vNIC placement handler consumes the information provided in the MAC learning table to identify the vNICs that should be mapped to the same DPU to optimize network traffic management.

Moreover, method 600 includes step 614 for relocating the two vNICs (identified in step 612) to be local on the same DPU. Specifically, this step is performed by the centralized vNIC placement handler to place one of the two vNICs together with another vNIC to co-locate on the same DPU. This ensures that virtual machines (equipped with vNICs) on the same host communicating with each other must get mapped to the same DPU to reduce network latencies and improve efficiency.

While the above is a full description of the specific embodiments, various modifications, alternative construc-tions, and equivalents may be used. Therefore, the above description and illustrations should not be taken as limiting the scope of the present invention which is defined by the appended claims.

What is claimed is:

1. A system for optimizing network traffic management, the system comprising:

a plurality of data processing units (DPUs), each assigned an identifier and configured to process network traffic for associated virtual network interface cards (vNICs);

a vNIC placement handler configured to receive media access control (MAC) address information from the plurality of DPUs and execute a relocation of at least two of the vNICs to be directly associated with one of the plurality of DPUs without going through an inter-DPU physical network based on mapping the MAC address information to the identifier; and a communication framework integrated with the vNIC placement handler to enable transmission of MAC address information from the plurality of DPUs to the vNIC placement handler and offload network traffic from the vNICs to the plurality of DPUs.

2. The system of claim 1, wherein the identifier comprises a combination of a globally unique host ID and a DPU ID unique to each host.

3. The system of claim 1, wherein the vNIC placement handler is integrated with an architecture of one or more hosts in a virtualized computing environment.

4. The system of claim 1, wherein the vNIC placement handler is configured to provide centralized management over one or more software-based hypervisors run on each host in a virtualized computing environment.

5. The system of claim 2, wherein the vNIC placement handler is configured to construct a MAC learning table to map the MAC addresses of the vNICs to respective DPU IDs.

6. The system of claim 5, wherein the vNIC placement handler is configured to identify benefits to network traffic management of relocating at least two vNICs on one of the plurality of DPUs based on the MAC learning table.

7. The system of claim 6, wherein the vNIC placement handler is configured to relocate the vNICs based on real-time analysis of DPU load conditions and network traffic patterns.

8. The system of claim 1, wherein the plurality of DPUs comprises two or more active physical network interface cards with central processing unit cores.

9. The system of claim 1, wherein any two vNICs that are detected to be associated with communication via inter-DPU physical network traffic are configured to be relocated on the same DPU among the plurality of DPUs.

10. The system of claim 1, wherein the communication framework comprises a virtual switch implemented in a software-based hypervisor to manage communications between any two of the vNICs via at least one DPU.

11. A method for optimizing network traffic management within a computing environment with at least two data processing units (DPUs), the method comprising:

assigning identifiers unique respectively to the two DPUs within the computing environment;

implementing a placement handler configured to manage the placement of virtual network interface cards (vNICs) on the two DPUs;

collecting, by each DPU, media access control (MAC) address information associated with the vNICs;

transmitting the MAC address information from each DPU to the placement handler;

constructing, by the placement handler, a MAC learning table that maps MAC addresses to the identifiers of the two DPUs based on the MAC address information;

identifying, by the placement handler, instances where network traffic between any two vNICs would benefit from being co-located on one of the two DPUs, based on the MAC learning table;

relocating, by the placement handler, two identified vNICs on the same DPU.

12. The method of claim 11, wherein assigning identifiers unique respectively to the two DPUs comprises establishing each identifier with a combination of a globally unique host ID and a DPU ID unique to each host.

13. The method of claim 11, wherein implementing the placement handler comprises configuring the placement handler to provide centralized management via multiple software-based hypervisors run on one or more hosts in a virtualization infrastructure of the computing environment.

14. The method of claim 11, wherein implementing the placement handler further comprises integrating with a virtual switch to manage network traffic control in a virtualization infrastructure of the computing environment.

15. The method of claim 11, wherein collecting, by each DPU, MAC address information comprises using DPU management tools and automation to query the MAC address of each vNIC.

16. The method of claim 11, wherein transmitting the MAC address information from each DPU to the placement handler comprises formatting the MAC address information in a data format and transmitting formatted data with secure protocols and regular updates.

17. The method of claim 11, wherein constructing the MAC learning table comprises structuring it with a data structure comprising at least the MAC address of each vNIC on the host and the identifiers of DPUs locally or remotely associated with the vNIC.

18. The method of claim 11, wherein identifying comprises analyzing network traffic patterns associated with the two vNICs having communication through an inter-DPU physical network and querying the MAC learning table to check if the two DPUs are on the same host.

19. The method of claim 18, further comprises dynamically adjusting the placement of vNICs based on real-time analysis of DPU load conditions and network traffic patterns to continuously optimize network traffic management.

20. A method for optimizing network traffic management in a virtualized computing environment comprising:

identifying a first data processing unit (DPU) and a second DPU uniquely by respective two identifiers;

implementing a placement handler centralized for managing multiple software run in a host of the virtualized computing environment including at least two virtual network interface cards (vNICs);

collecting, by each DPU, media access control (MAC) address information associated with the two vNICs;

storing the MAC address information, by the placement handler, to construct a MAC learning table that maps MAC addresses of the at least two vNICs respectively to the two identifiers of the first DPU and the second DPU;

detecting, by the placement handler querying the MAC learning table, communications between the two vNICs through a physical network via both the first DPU and the second DPU; and relocating the two vNICs both to be local on either the first DPU or the second DPU.

* * * * *